United States Patent [19]

Abe et al.

[11] Patent Number: 4,616,107

[45] Date of Patent: Oct. 7, 1986

[54] PATTERN INPUT APPARATUS

[75] Inventors: Kiyomi Abe, Noda; Mitsuo Kazama, Soka; Hiroshi Kobayashi, Koshigaya, all of Japan

[73] Assignee: Pentel Kabushiki Kaisha, Tokyo, Japan

[21] Appl. No.: 705,550

[22] Filed: Feb. 26, 1985

[30] Foreign Application Priority Data

Feb. 29, 1984 [JP] Japan .................................. 59-37679

[51] Int. Cl.[4] ............................................ G08C 21/00
[52] U.S. Cl. ........................................ 178/18; 178/19
[58] Field of Search ..................... 178/18, 19; 364/520

[56] References Cited

U.S. PATENT DOCUMENTS 4,507,523 3/1985 Gohara et al. ........................ 178/19
4,554,409 11/1985 Mitsui et al. .......................... 178/19

Primary Examiner—Stafford D. Schreyer
Attorney, Agent, or Firm—Robert E. Burns; Emmanuel J. Lobato; Bruce L. Adams

[57] ABSTRACT

Disclosed is a pattern input apparatus in which an input pen is made to be in contact with a tablet having a matrix composed of sets of conductors disposed at intervals along coordinate axes, thereby applying hand writing information to an electronic computer, or the like. In this pattern input apparatus, the input pen is made to be contact with or moved on the upper surface of the tablet to thereby obtain detection signals, the respective potential levels of at least three higher ones of the obtained detection signals being selected out, the detection signal having the highest potential level among the three selected out detection signals being regarded as a reference signal, subtraction being made between the reference signal and each of the remainder ones of the three selected out detection signals to obtain two potential differences, thereby determining the position of the pen on the basis of the ration between the two potential differences.

3 Claims, 6 Drawing Figures

PATTERN INPUT APPARATUS

BACKGROUND OF THE INVENTION

1. Field of the Invention

The present invention relates to a pattern input apparatus, and particularly to a pattern input apparatus in which an input pen is caused to come in contact with an upper face of a tablet provided with a matrix of groups of conductors disposed at intervals along coordinate axes so as to input hand writing information into an electronic computer system, or the like.

2. Description of the Prior Art

A tablet having a grid of parallel conductors disposed along coordinate axes at regular intervals is disclosed, for example, in U.S. Pat. Nos. 3,567,859, and 3,732,369. In such a tablet, conductors belonging to one group are successively electrically actuated one after one with a pulse signal and then conductors in the other group are successively electrically actuated one after one with a pulse signal. An input pen having an electrically conductive tip end is made to come into contact with the face of such a tablet to make capacitive coupling with a pair of adjacent conductors. Signals obtained by the input pen from the conductors successively actuated with pulses is used to digitalize the coordinates of the position of the pen on the surface of the tablet. The position digitalizing operation is performed such that the position of input the pen is digitalized along one coordinate axis and then digitalized along the other coordinate axis.

In such a tablet type information input, it is a significant problem how to rapidly and high-accurately detect information as to a positional relation between conductors in performing pattern input. Referring to FIG. 1, a manner how to detect the position of the input pen will be described. FIG. 1 shows electrical potential levels on the conductors arranged on the tablet in the direction X. Characters $L_0$, $L_1$, and $L_2$ designate the respective potential levels when a voltage is applied to conductors $X_0$, $X_1$, and $X_2$ arranged at a distance W in the direction X. The potential level is approximately proportional to the distance. Assuming that an input pen is made to come in contact with a point T separated from the conductor $X_1$ by a distance x, the distance x can be obtained by performing calculation in accordance with the following expression:

$$x = \frac{b - c}{b + d - 2c} \cdot W$$

where d designates the highest potential level, b the second highest potential level, and c an offset value to be set for compensating for a change in potential level depending on the thickness, the quality, the number of sheets of paper disposed on the tablet. In the case where the distance x is calculated in the manner as described above, it is required to change the offset value c always in accordance with the conditions of paper disposed on the tablet, resulting in less practical use.

Accordingly, in British Pat. No. 1,440,130, there has been proposed a position indicating system based on a well known three-point detection method. According to this British patent, three signal levels are detected from three conductors, one being the nearest to the position of an input pen and the other two being adjacent to the nearest one, and the thus obtained signal levels are compared with each other to thereby obtain position information as to the input pen without being affected by the above-mentioned offset value. In this system, however, it is an indispensable condition to perform a complex calculation requiring a numbers of subtractions after the respective ratios among the three detection signals have been obtained, so that the calculation is very troublesome and when a general purpose microcomputer, or the like, is employed, there is a limit in hand writing speed to thereby make it impossible to make the system higher in its processing speed.

SUMMARY OF THE INVENTION

An object of the present invention is to provide a pattern input apparatus in which the position of an input pen can be accurately detected at a high speed without affected by the condition of paper, or the like, mounted on a tablet.

Another object of the present invention is to provide a pattern input apparatus which has a simple arrangement and in which sufficiently high speed input can be attained even in the case where a general purpose microcomputer is employed.

According to the present invention, there is provided a pattern input apparatus comprising: a tablet having a matrix composed of two sets of conductors disposed at intervals along coordinate axes; a pair of scanning means for successively supplying the conductors of the respective sets with scanning pulses; an input pen for detecting application of the scanning pulse on adjacent ones of the conductors when the input pen is positioned on the tablet, thereby producing position signals; a selecting circuit for selecting at least three ones of the position signals respectively having higher electric potentials; and an operation circuit for determining the position of the input pen in such a manner that one of the three selected position signals having the highest level is regarded as a reference signal and subtractions are performed between the reference signal and each of the remainder ones of the three selected position signals to obtain two potential differences, whereby the position of the input pen is determined from the ratio between the two potential differences.

In the pattern input apparatus according to the present invention, at least three higher signals and the potentials thereof are detected among the signals obtained by making the input pen come into contact with or displaced along the face of the tablet. That is, the invention employs such a system that the signals and the potentials of the conductor to which the input pen is most adjacently positioned and two conductors positioned at both sides of the first-mentioned conductor ajdacently thereto, the signal having the highest potential among these three signals is regarded as a reference signal, two potential differences are obtained by performing subtractions between the reference signal and each of the two remainder signals, and position of the input pen is determined by the ratio between the two potential differences. Accordingly, the error due to the influence of the above-mentioned offset value can be completely eliminated, the operation circuit may be constituted by a general purpose computer because of simplicity of calculations, and sufficiently high speed input can be obtained.

The above-mentioned and other objects, features and advantages will be more apparent from the following detailed descriptions with resepct to the embodiment illustrated in the accompanying drawings.

DESCRIPTION OF PREFERRED EMBODIMENT

Figure 1:
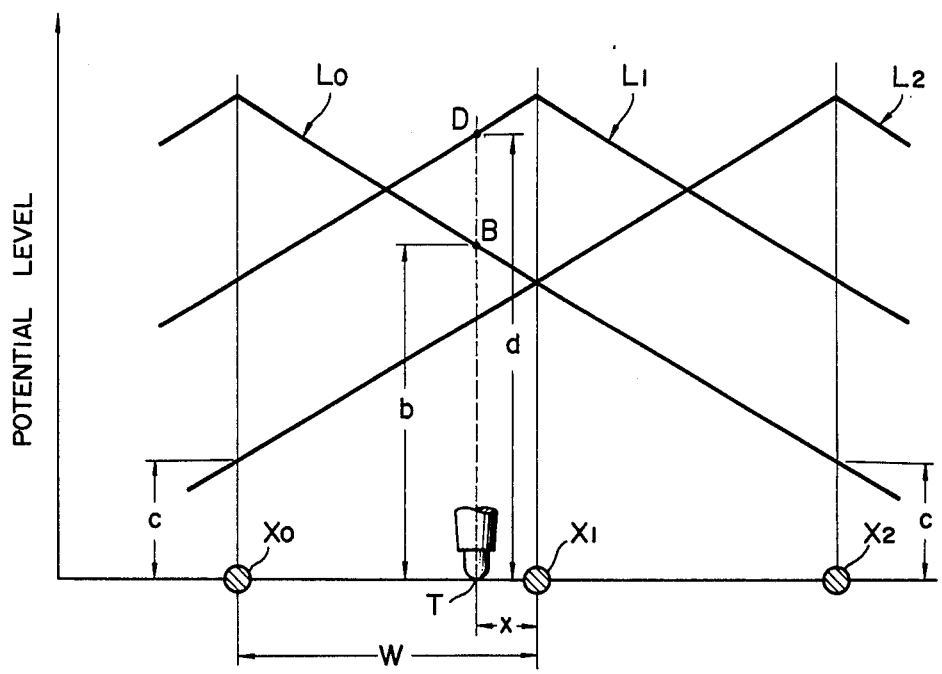
FIG. 1 is a digram showing the state of distribution of potentials, for explaining the principle of the conventional position detecting method.
Figure 2:
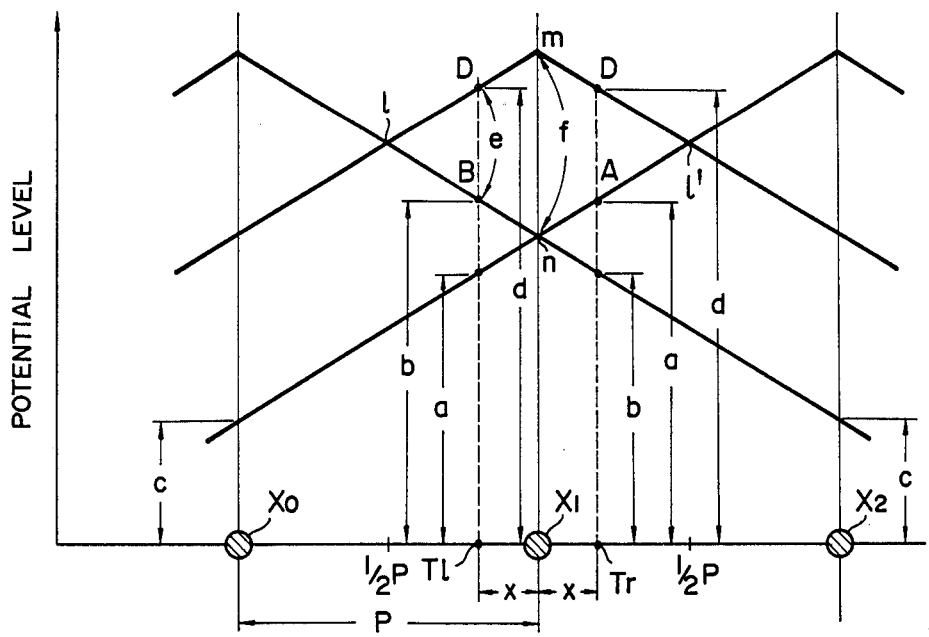
FIG. 2 is a diagram showing the state of distribution of potentials, for explaining the principle of the position detection according to the present invention.
Figure 3:
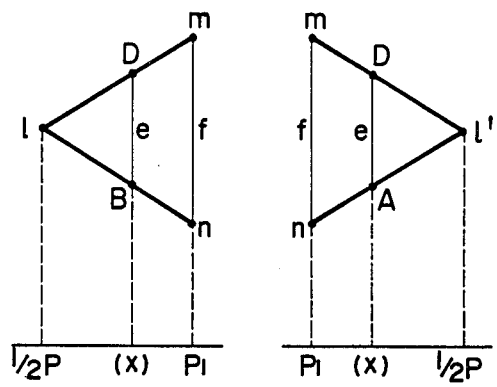
FIG. 3 is an explanatory diagram showing a main part of FIG. 2.

Referring to FIGS. 2 to 6, a preferred embodiment of the present invention will be described hereunder. Referring first to FIG. 2, the principle of the present invention is described. FIG. 2 shows the state of potential distribution similarly to that shown in FIG. 1, in which the conductors are parallelly disposed at a regular interval P.

Assume that the input pen is now made to come into contact with a point Tl or Tr separated from the center conductor $X_1$. Assume that the respective potential levels detected from the left hand conductor $X_0$, the right hand conductor $X_2$, and the center conductor $X_1$ are designated by reference characters b, a, and d respectively. Attention is made now to a triangle lmn formed by connecting the intersection point l between the respective potential levels of the conductors $X_0$ and $X_1$, the peak point m of the potential level of the conductor $X_1$, and the intersection point n between the respective potential levels of the conductors $X_0$ and $X_2$, and another triangle lDB formed by connecting the potential level point D of the conductor $X_1$ at the point Tl with which the input pen is in contact, the potential level point B of the conductor $X_0$, and the above-mentioned point l. Further assume that the potential difference obtained by subtracting the potential level b at the potential level point B from the potential level d at the potential level point D is designated by the reference character e. The potential difference f between the points m and n has a value obtained by subtracting the potential level a at the potential level point A of the conductor $X_2$ at the point Tl with which the input pen is in contact from the potential level d, because the potential distributions of the respective conductors are the same with each other. Accordingly, the following relation can be obtained from the geometrical relation between the abovementioned triangles lmn and lDB.

$$\frac{e}{f} = \frac{d-b}{d-a} = \frac{\frac{1}{2}P - x}{\frac{1}{2}P} \quad (1)$$

Similarly to this the following relation can be obtained if attention is made on the triangles l'mn and l'DA.

$$\frac{e}{f} = \frac{d-a}{d-b} = \frac{\frac{1}{2}P - x}{\frac{1}{2}P} \quad (2)$$

The position x with which the input pen is in contact is finally obtained by the following expression.

$$x = \frac{1}{2}P - \frac{1}{2} \cdot \frac{e}{f} P \quad (3)$$

That is, if the positions to the point separated from the conductor $X_1$ (n=0, 1, 2 ...) by −P at the both sides of the conductor $X_n$ are detected, the position of the input pen can be obtained in the same manner as above even if at any position the input pen exists because the potential distribution is a repeated one. Although description has been made above as to the X-axis direction, the same applies to the Y-axis direction, so that the contacting position of the input pen can be determined independently of the above-mentioned offset value c.

Figure 4:
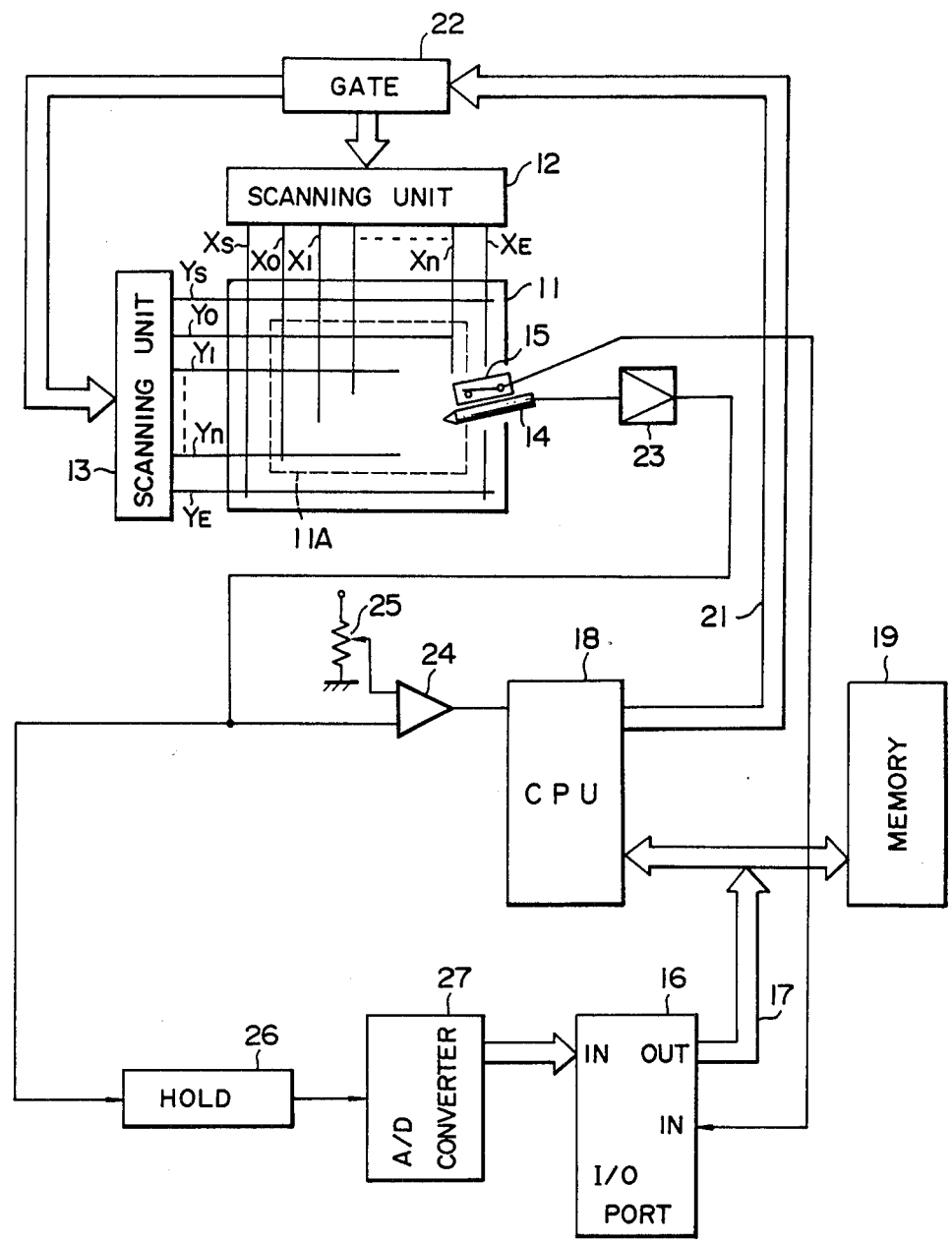
FIG. 4 is an electrical block diagram showing an embodiment of the present invention.

Referring to FIG. 4, the electrical arrangement will be described. FIG. 4 shows a tablet having a set of a plurality of conductors $X_0$, $X_1-X_n$, $X_S$, and $X_E$ each parallelly extending in the Y-direction and separated one from another by predetermined interval in the X-direction, and another set of a plurality of conductors $Y_0$, $Y_1-Y_n$, $Y_S$, and $Y_E$ each parallelly extending in the X-direction and separated one from another by a predetermined interval in the Y-direction. Since such a tablet is known from the above-mentioned U.S. Pat. Nos. 3,567,859 and 3,732,369, detailed description is omitted thereabout. The reference numeral 11A in the tablet 11 designates an effective area where signal detection can be made on the tablet.

The two sets of conductors $X_0$, $X_1-X_n$, $X_S$, $X_E$ and $Y_0$, $Y_1-Y_n$, $Y_S$, $Y_E$ are connected to the respective output terminals of scanning devices 12 and 13 from which scanning pulses are supplied successively to the conductors. An ON-OFF switch 15 actuated in response to the contact of an input pen 14 with the tablet 11 is incorporated in the input pen 14. The ON-OFF switch 15 is connected to one input of an input/output port 16. An output bus 17 of the input/output port 15 is connected to a microcommputer 18 and a memory 19 so that an output signal from the ON-OFF switch 15 is applied to the microcomputer 18 through the input/output port 16. An output bus 21 of the microcomputer 18 is connected to the respective input terminals of the scanning devices 12 and 13 through a gate circuit 22. The microcomputer 18 supplies a scanning pulse to the scanning device 12 or 13 in response to the output signal from the ON-OFF switch 15, and counts the scanning pulse. The gate circuit 22 acts to change over the application of the pulse from the microcomputer 18 between the scanning devices 12 and 13. In response to the pulse from the gate circuit 22, the scanning device 12 or 13 supplies a scanning pulse successively to the conductors one after one.

The input pen 14 detects the existence of the scanning pulse through capacitive coupling with the tablet 11 and the output of the input pen 14 is connected to one input terminal of a comparator 24 through an amplifier 23. A variable resistor 25 is connected at its output to the other input terminal of the comparator 24 so as to apply a slice voltage of a predetermined level thereto. The output of the comparator 24 is connected to an interruption terminal of the microcomputer 18 so that when a signal having a level larger than the predetermined slice level is received the comparator 24 produces the received signal to the microcomputer 18. In this embodiment, the slice level is preset such that signals can be detected from at least three conductors in the vicinity of the contacting point of the input pen 14. In response to the output signal of the comparator 24, the microcomputer 18 stops the application of the scanning pulse to the gate circuit 22 and steps the pulse counting operation. The output of the amplifier 23 is connected to a sampling/holding circuit 26 which temporarily stores the output signal from the amplifier 23 so as to assure the time taken for performing analog-to-digital conversion of the output signal. The output of the sampling/holding circuit 26 is connected to an analog-to-digital converter 27 in which the output signal of the amplifier 23 is digitalized. The output of the analog-to-digital converter 27 is connected to the other input terminal of the input/output port 16 so that the output of the analog-to-digital converter 27 is stored in the memory 19 as a potential level through the input/output port 16. The microcomputer 18 acts as a control circuit as well as a calculation circuit for controlling and managing the memory 19, the input/output port 16, etc., and may be constituted, for example, by a microcomputer of Z80 type produced by ZILOG in U.S.A. and available on the market. As the input/output port 16, No. 8255 produced by INTEL in U.S.A. may be used. It is a matter of course that the microcomputer 18 and the input/output port 16 are not restricted to the above-mentioned products.

After having caused the memory 19 to store the signals detected by the input pen 14, the microcomputer 18 starts the counting operation again. At this time, the counting is initiated from the count which is incremented by one from the count when the counting has been stopped last. Thus, when the signal detected from the input pen 14 is passed through the microcomputer 18 again, the microcomputer 18 stops the counting again as described above and compares the potential level at this time with the potential level previously stored. Repeating the similar operations thereafter, the potential distribution in the vicinity of the contacting point of the input pen is detected.

Figure 5:
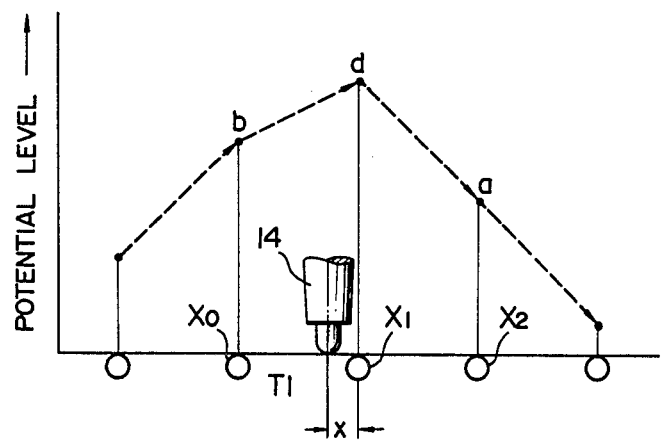
FIG. 5 is a diagram for explaining the potential levels detected from the respective conductors in FIG. 4.

In repeating this operation, the potential level which has been increasing so far begins to decrese after it exceeds a certain peak, as seen in FIG. 5. FIG. 5 shows the potential levels detected from the respective conductors when the input pen 14 is in contact with the point T1. The reference characters b, d, and a designate the potentials detected from the conductors $X_0$, $X_1$, and $X_2$. That is, upon recognizing the decrease in potential level in the above-mentioned repeating operations, the microcomputer 18 detects the potential levels b, d, and a of the respective conductors $X_1$ nearest to the contacting point of the input pen 14 and $X_0$ and $X_2$ adjacent to the conductor $X_1$, respectively. The judgement as to whether the contacting position of the input pen 14 is on the right side or on the left side of the adjacent conductor $X_1$ is performed by the microcomputer 18 through comparison between the potential levels b and a. Based on the result, the contacting position of the input pen 14 is determined in accordance with the above-mentioned expression (3). As to the Y-direction, the contacting position of the input pen 14 is obtained quite in the same manner as above. After the contacting position of the input pen 14 has been determined in the X- and Y-directions, the microcomputer 19 transfers this positional information to an output device such as a cathode ray tube (CRT) (not shown), or the like.

Figure 6:
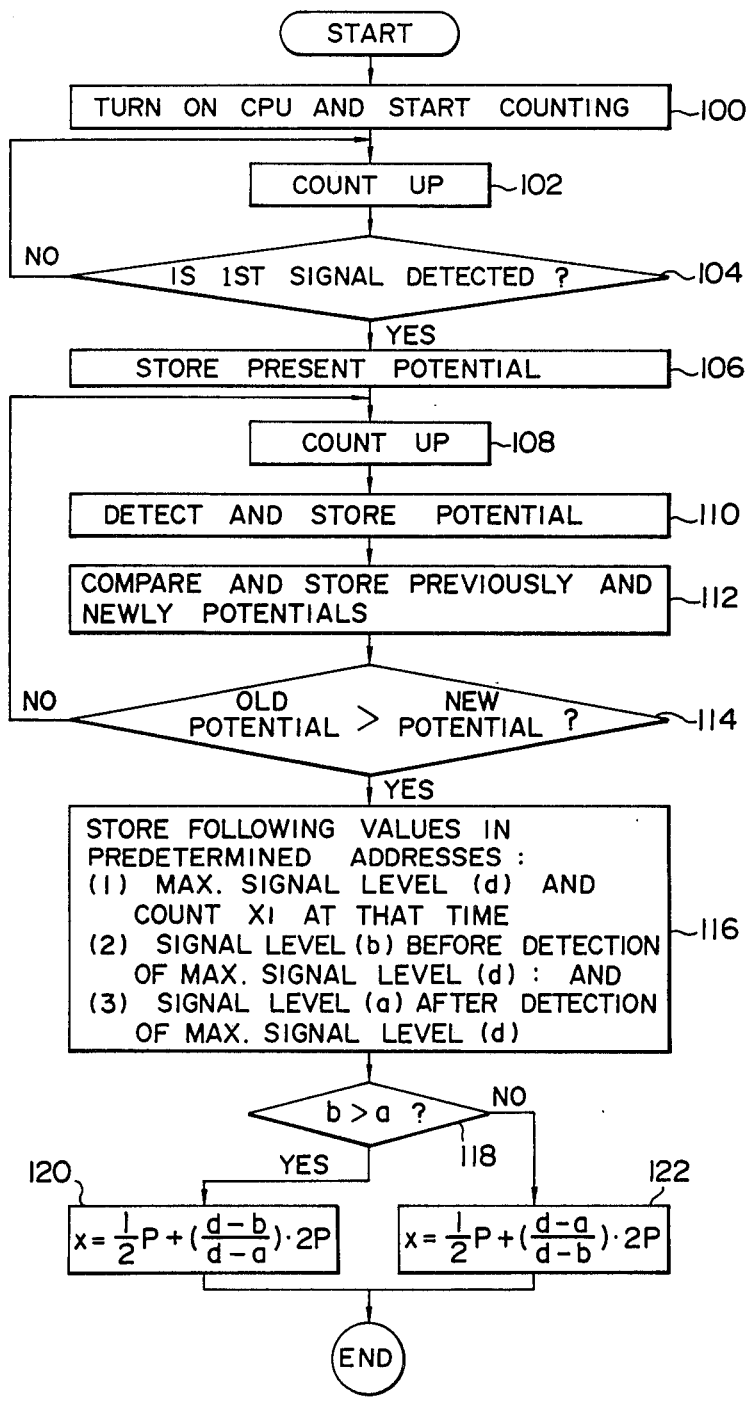
FIG. 6 is a flowchart for explaining the operation of the whole of FIG. 4 embodiment.

Next, the entire operations will be described by referring to the flowchart of FIG. 6. When the input pen 14 is in contact with the tablet 11, the microcomputer 18 is actuated in response to the signal from the ON-OFF switch 15 to supply the scanning device 12 or 13 with a scanning pulse through the gate circuit 22 and, at the same time, begin to count up the number of the applied scanning pulses (step 100). This counting-up is continued until the first signal from the tablet 11 is detected (steps 102 and 104). Upon detection the first signal, the microcomputer 18 transfers the potential level of the signal at this time to the memory 19 so that this potential level is stored in the memory 19 (step 106). After the potential level has been stored, the counting-up operation is performed again (step 108). Upon detecting the next signal by the input pen 14, the microcomputer 18 transfers the potential level at this time to the memory 19 in the same manner as the step 106 so as to cause the memory 19 to store this second potential level (step 110). The second potential level is compared with the first potential level (step 112) and when the former is lower than the latter the counting-up operation is performed again (steps 114 and 108). The counting-up, potential detecting, and comparing operations are repeatedly performed until the reduction in potential level is detected, as described above (steps 108, 110, and 112). When the potential level which has been detected one sampling before becomes higher than the current potential level, the repetition operation is ended (step 114). Then, the highest signal level d detected in this repetition operation, the count value $X_1$ at this time, the signal level b detected before the highest signal level is detected, and the signal level a detected after the highest signal level is detected are stored at predetermined addresses (step 116). The stored signal levels b and a are compared with each other (step 118) so as to judge at which side, right or left, of the conductor $X_1$ adjacent to the input pen 14, the input pen 14 is in contact. On the basis of this judgement, predetermined calculations are performed in accordance with the expression in the step 120 when the signal level b is larger than the signal level a, while in accordance with the expression in the step 122 when the former is smaller than the latter, thereby determining the contacting position of the input pen 14.

Although the present invention has been described as to a specified embodiment, it will be apparent for those skilled in the art that the present invention can be modified or altered in shapes, in details, or the like, without departing from the spirit and scope of the invention.

What is claimed is:

1. A pattern input apparatus comprising:
   a tablet having a matrix composed of two sets of conductors disposed at intervals along coordinate axes;
   a pair of scanning means respectively connected to said two sets of conductors for successively supplying the conductors of said respective sets with scanning pulses;
   an input pen for detecting application of said scanning pulse on adjacent ones of said conductors when said pen is positioned on said tablet, thereby producing position signals;
   a selecting circuit for selecting at lest three ones of said position signals respectively having higher electric potentials; and
   an operation circuit for determining the position of said input pen in such a manner that one of said three selected position signals having the highest level is regarded as a reference signal and subtractions are performed between said reference signal and each of the remainder ones of said three selected position signals to obtain two potential differences, whereby the position of said pen is determined from the ratio between said two potential differences.

2. A pattern input apparatus according to claim 1, in which said operation circuit includes a converter for digitalizing each of said position signals, and a memory for storing said digitalized signal in the form of a potential level, said memory being controlled to store said digitalized signal only when an output signal from said selecting circuit exists.

3. A pattern input apparatus according to claim 1, in which said operation circuit is constituted by a computer for applying said scanning pulse to said pair of scanning means and for counting the number of the applied scanning pulses, the application and counting of said scanning pulse being stopped in response to the signal from said selecting circuit.

* * * * *